June 17, 1941.    M. TELKES    2,246,329
HEAT ABSORBER
Filed June 13, 1939
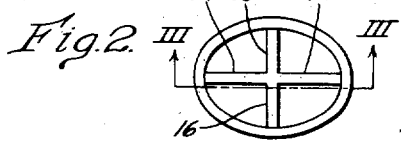
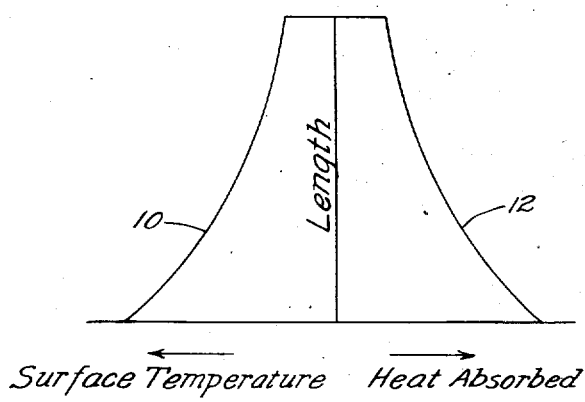
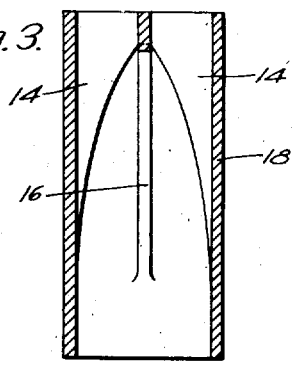
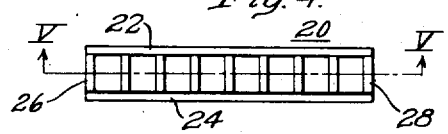
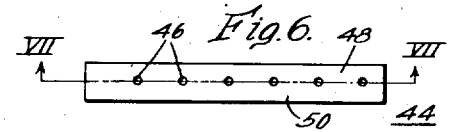
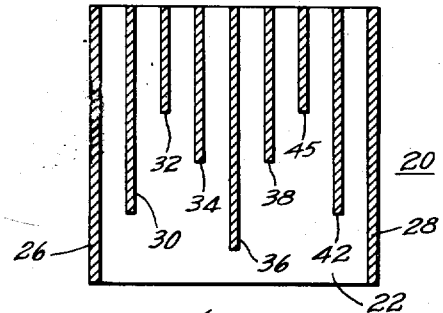
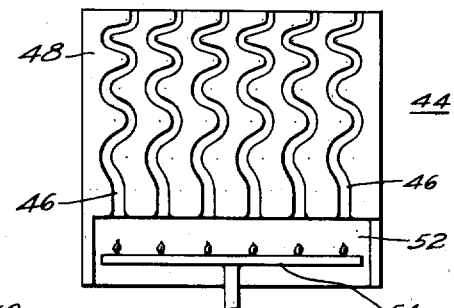
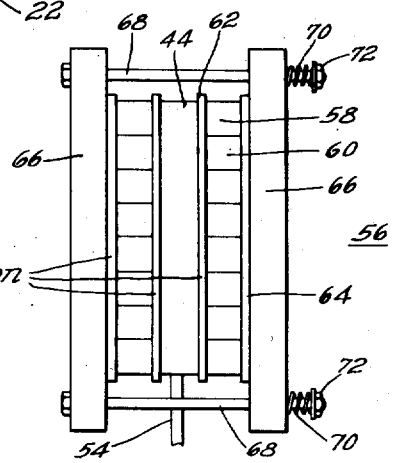
WITNESSES:
C. J. Weller.
James N. Ely
INVENTOR
Maria Telkes.
BY
Ezra W. Savage
ATTORNEY Patented June 17, 1941

2,246,329

UNITED STATES PATENT OFFICE 2,246,329

HEAT ABSORBER

Maria Telkes, Edgewood, Pa., assignor to Westinghouse Electric & Manufacturing Company, East Pittsburgh, Pa., a corporation of Pennsylvania Application June 13, 1939, Serial No. 278,865

2 Claims. (Cl. 257—1)

This invention relates to thermo-electric generators, and particularly to the heat absorber utilized in transmitting heat from a source of supply to and concentrating it on the hot junction of the thermo-couple assembly of thermo-electric generators.

Heretofore, many different types of heat absorbers have been utilized in transmitting heat from a source of supply to the thermo-couple assembly of a thermo-electric generator. The known heat absorbers, however, have a number of disadvantages in that the temperature distribution at the surface of the heat absorber adjacent the hot junction of the thermo-couple assemblage is quite uneven or the absorber is so open as to permit the hot flue gases to contact the hot junction of the thermo-couple assemblage, thereby causing damage to the unprotected hot junctions of the thermocouples. Where central combustion tube heat absorbers have been employed surrounded by radially disposed thermal elements, attempts have been made to improve the heat distribution of the heat absorber by the insertion of or distribution of fins within the combustion tube. Other attempts have been made to utilize deflectors within the combustion tube to deflect the hot gaseous medium which is the source of supply of heat to the walls of the heat absorber, but these have all proved to be unsatisfactory for a number of reasons.

Where deflectors were employed, it was found that dead or stagnant pockets of the gaseous medium were so entrapped that it was impossible to get an even distribution of heat. Where fins were employed, they were utilized for the purpose of providing a larger heat absorption surface as distinguished from a constant rate of absorption by the heat absorber.

An object of this invention is to provide a heat absorber for use in thermo-electric generators whereby the heat transmitted from a source of supply to the hot junctions of the thermo-couple assembly of the thermo-electric generator is a substantially even distribution of heat throughout the length of the heat absorber.

Another object of this invention is to provide for securing a substantially even absorption of heat in a heat absorber from a heating medium throughout the length of the heat absorber while maintaining the heating medium within the heat absorber.

A further object of this invention is to provide a heat absorber having internal surfaces for providing increasingly larger heat absorption surfaces within the absorber to effect a substantially even absorption of heat from a heating medium throughout the heat absorber as the medium flows therethrough.

Another object of this invention is to provide a heat absorber having internal surfaces so geometrically distributed in the direction of flow of a heating medium from which heat is to be absorbed to effect a substantially even absorption of the heat therefrom throughout the length of the heat absorber.

Other objects of this invention will become apparent from the following description when taken in conjunction with the accompanying drawing, in which:

Figure 1 is a graph, the curves of which represent the surface temperature of a tubular member where a heating medium flows through the tubular member and the heat absorbed by the tubular member respectively as plotted against the length of the tubular member;

Fig. 2 is a plan view of a tubular heat absorber having a plurality of fins disposed therein in accordance with the teachings of this invention;

Fig. 3 is a view in section of the tubular heat absorber taken along the line III—III of Fig. 2;

Fig. 4 is a plan view of a heat absorber constructed in accordance with the teachings of this invention;

Fig. 5 is a view in section taken along the line V—V of Fig. 4;

Fig. 6 is a plan view of another embodiment of a heat absorber constructed in accordance with this invention;

Fig. 7 is a view in section taken along the line VII—VII of Fig. 6; and

Fig. 8 is an end elevational view of a thermo-electric generator embodying a heat absorber in accordance with the teachings of this invention.

Referring to Figure 1 of the drawing, it is found that in tubular heat absorbers having a source of supply such as a Bunsen burner (not shown) at one end thereof, the surface temperature of the tubular member as the gases flow therethrough may be represented by the curve 10. It is thus seen that as the length of the tubular member increases from the source of supply, the surface temperature of the tubular member greatly decreases. Thus the rate of heat absorbed in the tubular member adjacent the source of supply is greater as represented by the curve 12, than is the rate of heat absorbed adjacent the open end of the tubular member.

In order to overcome the disadvantages of the known art and to provide for a substantially constant rate of heat absorption along the walls of a tubular heat absorber, this invention provides for so increasing the internal surfaces of the heat absorber as to compensate for the drop in temperature of the heating medium as it flows through the tubular member. Referring specifically to Figs. 2 and 3 of the drawing, this invention is illustrated as comprising a plurality of fins 14 and 16 so disposed within and in physical and thermal contact with the tubular member as to give surfaces throughout the length of the tubular heat absorber 18 corresponding substantially with the curves of the heat absorber as found for a plain tubular member of similar size and construction. That is, the fins 14 and 16 are so geometrically distributed within the tubular member 18 in the direction of flow of the heated gaseous medium as it flows upwardly through the tubular member to effect a substantially even absorption of heat therefrom throughout the length of the tubular member 18.

Referring to Figs. 4 and 5, this invention is illustrated by reference to a comparatively flat heat absorber 20 formed of side plates 22 and 24 and end plates 26 and 28. The side and end plates can be of any good thermal conducting material, and in practice are welded together to form a substantially rigid structure. In order to provide for a substantially constant rate of heat absorption by the side plates 22 and 24 of the heat absorber, a plurality of fins 30, 32, 34, 36, 38, 40 and 42 are disposed substantially parallel to the end plates 26 and 28 and are welded to the side plates 22 and 24 to give a good physical and thermal contact therewith. The center fin 36 is shown to be of substantially the same length as the length of the heat absorber 20 and is thus provided in order to mechanically reenforce the heat absorber throughout its length. The fins 30, 32, 34, 38, 40 and 42, however, are considerably shorter and are so distributed between the side plates 22 and 24 as to correspond substantially with the decrease of surface temperature for tubular members as a heated gaseous medium is passed therethrough. These fins are provided in order to give increasing larger heat absorbing surfaces at the points where the surface temperature is normally decreasingly low. Thus, by increasing the heat absorbing surfaces near the end of the heat absorber opposite the source of supply of heat, the decrease in wall surface temperature of a heat absorber not provided with the fins of this invention is equalized, the fins being cooperative to effect a substantially constant or even rate of heat absorption from the heating medium throughout the length of the heat absorber.

For the most efficient operation of the heat absorber illustrated in Figs. 4 and 5, it is found that the fins which are of good thermal conducting material, must be not over one-half inch apart. The fins may be closer, depending upon the rate of flow of the heated gaseous medium from which heat is to be absorbed, a faster flow of the gaseous medium requiring closer spacing of the fins. In tests conducted with heat absorbers constructed as described hereinbefore and shown in Figs. 4 and 5, it is found that the heat absorbers have a heat transfer efficiency of between 60 and 70%, giving a very uniform temperature distribution throughout the length of the heat absorber, the temperature deviating not more than 10° C. at any one point on the external surfaces of the absorber for a temperature of 440° C. Corresponding results can be obtained for other surface temperatures.

In another embodiment of this invention as illustrated in Figs. 6 and 7, a heat absorber 44 is utilized having a plurality of openings 46 disposed in spaced relation to each other and extending throughout the length of the heat absorber. The openings 46 are of a tortuous form with the pitch of the curves progressively changing, the diameter of the openings decreasing and the internal surfaces thereof converging towards each other in the direction of flow of the gaseous medium through the heat absorber. As illustrated, the heat absorber 44 is formed of two parts 48 and 50 which can be made by casting a metal having good thermal conducting characteristics, each half of the casting having substantially half of each of the openings 46 therein. In casting the heat absorber 44, a cavity 52 is also provided at the bottom of the casting for receiving a suitable burner or flame spreader 54, as illustrated. When the two halves 48 and 50 of the heat absorber are assembled, the cavity 52 and the openings 46 through the heat absorber 44 are completely enclosed so that the heated gaseous medium flowing from the flame spreader 54 is retained within the heat absorber until it flows completely therethrough.

In order to illustrate the utilization of the heat absorber of Figs. 5 and 7, this invention is shown in Fig. 8 as embodied in a thermo-electric generator 56. As shown in Fig. 8, the heat absorber 44 of Fig. 7 is employed, disposed in good thermal contact with a plurality of thermo-couple assemblies, each of which comprises a positive element 58 and a negative element 60 having their hot junctions in good thermal contact with the external surfaces of the sides of the heat absorber 44, but electrically insulated therefrom by means of a film of any suitable electrical insulation 62, such as mica. The thermo-couple assemblies are connected in series circuit relation, (not shown), and the conductors connecting them in the series circuit relation on the ends opposite the hot junctions thereof are covered by means of a layer 64 of electrical insulating material, such as mica, similar to the layer 62.

In order to retain the thermo-couple assemblies in good thermal contact with the heat absorber 44, cooling plates 66 are disposed or positioned over the electrical insulating film 64 and are retained in this position by means of a plurality of bolts 68 disposed about the periphery of the cooling plates. The cooling plates may be provided with cooling fins (not shown) or may be so constructed as to be water-cooled. As illustrated, springs 70 are so disposed about the ends of the bolts 68 between the cooling plates 66 and the nuts 72 that a substantially constant pressure may be maintained on the assembled thermo-couple elements and the heat absorber 44 by adjusting the nut 72. The heat absorber 44 is very efficient in transmitting the heat from a suitable source of supply, as the flame spreader 54, to the hot junction of the thermo-couple assemblies held in position thereabout, by means of the cooling plates 66.

In all of the forms hereinbefore described, it is found that there is a complete absence of dead or stagnant gas pockets as the heated gaseous medium flows through the heat absorber. Instead, there is a turbulent flow of the gaseous medium effecting a good surface contact of the heated gases with the heat absorbing surfaces of the heat absorbers. Since the heat absorbing surfaces increase in accordance with the decrease in surface temperature for a plain tubular member as the heated gases flow therethrough, it is readily apparent that the fins or the converging openings of Fig. 7 having internal surfaces progressively in closer contact with a flowing heated medium are effective in securing a substantially even absorption of heat from the heating medium throughout the length of the heat absorber.

Although this invention has been described with reference to particular embodiments thereof, it is, of course, to be understood that other and various embodiments may be made. This invention is, therefore, not to be limited except insofar as is necessitated by the prior art and the scope of the appended claims.

I claim as my invention:

1. A heat absorber for absorbing heat from a gaseous source of supply comprising in combination, a metallic member having good thermal characteristics, the metallic member having a cavity for receiving the source of supply of a heated gaseous medium and a plurality of openings defined by side walls disposed in spaced relation in the metallic member and extending from the cavity therethrough for the flow of the gaseous medium, each of the openings being of a curved tortuous form geometrically distributed with the pitch of the curves progressively changing and having its side walls converging towards each other in the direction of flow of the gaseous medium to effect a substantially even absorption of heat therefrom throughout the length of the metallic member as the gaseous medium flows from the cavity therethrough.

2. A heat absorber for absorbing heat from a gaseous source of supply comprising in combination, a metallic member having good thermal characteristics, the metallic member having a cavity for receiving the source of supply of a heated gaseous medium and a plurality of openings defined by side walls disposed in spaced relation in the metallic member and extending from the cavity therethrough for the flow of the gaseous medium, each of the openings being of a curved tortuous form with the pitch of the curves progressively changing and having its side walls converging towards each other in the direction of flow of the gaseous medium to effect a substantially even absorption of heat therefrom throughout the length of the metallic member as the gaseous medium flows from the cavity therethrough.

MARIA TELKES.